Oct. 16, 1923.

O. C. REEVES

WEIGHING SCALE 1,470,643

Original Filed Aug. 14, 1916    2 Sheets-Sheet 1

INVENTOR.
Orwell C. Reeves
by George R. Frye
Attorney

Oct. 16, 1923.

O. C. REEVES

WEIGHING SCALE

Original Filed Aug. 14, 1916     2 Sheets-Sheet 2

INVENTOR.
Orwell C. Reeves
by George R. Frye
Attorney

Patented Oct. 16, 1923.

1,470,643

UNITED STATES PATENT OFFICE.

ORWELL C. REEVES, OF TOLEDO, OHIO, ASSIGNOR TO TOLEDO SCALE COMPANY, OF TOLEDO, OHIO, A CORPORATION OF NEW JERSEY.

WEIGHING SCALE.

Application filed August 14, 1916, Serial No. 114,914. Renewed October 1, 1919. Serial No. 327,742.

*To all whom it may concern:*

Be it known that I, ORWELL C. REEVES, a citizen of the United States, residing at Toledo, in the county of Lucas and State of Ohio, have invented certain new and useful Improvements in Weighing Scales, of which the following is a specification.

This invention relates to improvements in scales adapted for use on a merchant's counter, and particularly to that type of counter scales known as cylinder scales. In scales of this type it has long been customary to provide an indication at the rear or customer's side of the scale to enable the customer to read the weight of the commodity placed on the scale platform. Heretofore, however, the construction of the upper portion of the scale containing the cylinder has been such that the opening at the rear of the cylinder through which the customer's indication was visible was so restricted and confined by adjacent parts that it was necessary for the customer to be almost directly back of the opening to read the indication. The majority of customers are averse to moving from their positions at the counter at either side of the scale to a position back of the scale at each weighing, though they are desirous of knowing that the scale really indicates the weight alleged by the merchant. The present invention, therefore, has for its primary object the provision of a cylinder head construction whereby the weight indication will be visible to the customer from a wide area at either side of, as well as directly behind, the scale.

Another object of the invention is to so construct and arrange the several elements adjacent the customer's indication that an excellent illumination may be readily provided for this indication and for advertising or directive signs contiguous thereto.

Other objects and advantages will be apparent from the following detail description of the preferred embodiment of my invention. Reference is to be had to the accompanying drawings, wherein similar reference numerals designate similar parts throughout the several views.

In the drawings:—

Figure 1:
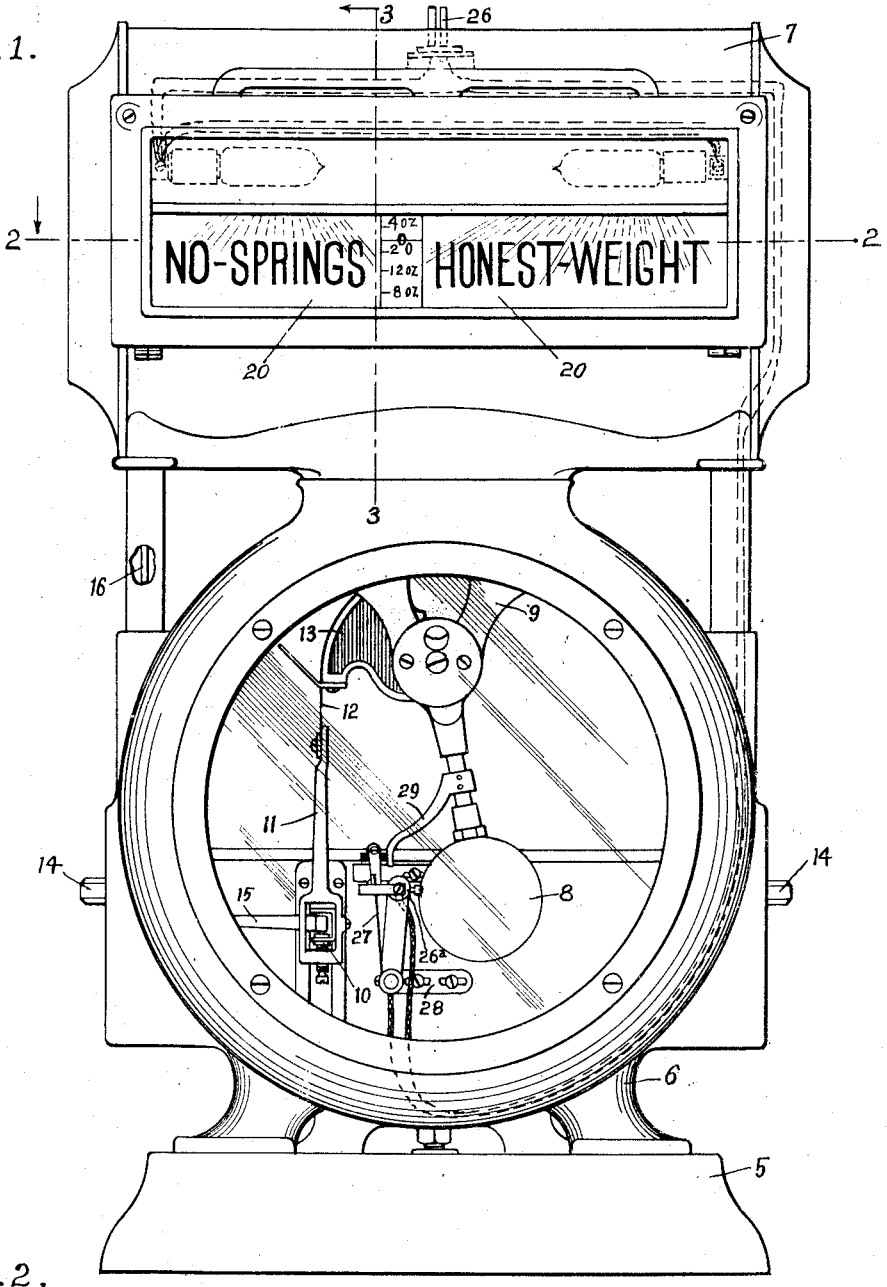
Figure 1 is a rear elevation of a cylinder scale constructed in accordance with my invention.
Figure 2:
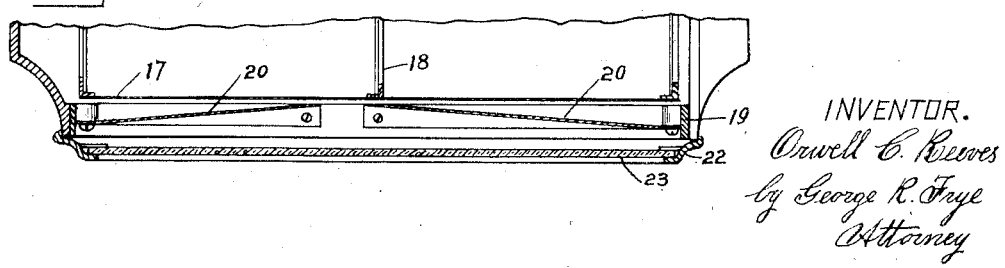
Figure 2 is a horizontal section taken substantially on the line 2—2 of Figure 1 looking in the direction of the arrow.

In the drawings I have illustrated one preferred embodiment of my invention in which I have, for the sake of a clear and definite description but without intention of limitation thereto, chosen to show a scale employing a pendulum weighing mechanism and a cylinder or drum indicating mechanism, which constructions are well known in the art.

Figure 3:
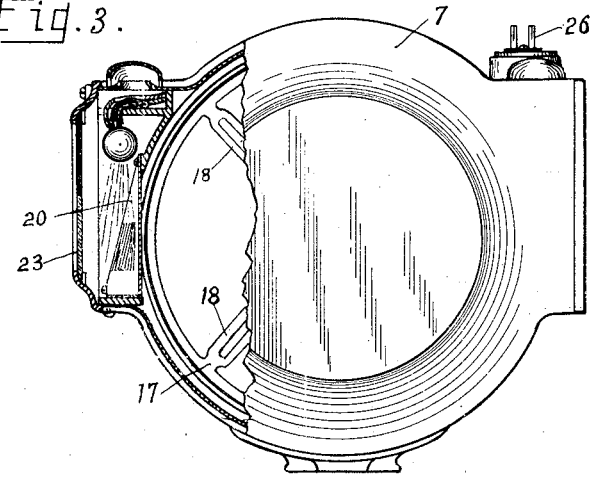
Figure 3 is an end elevation of the cylinder head, with parts broken away and in section on substantially the line 3—3 of Figure 1.
Figure 4:
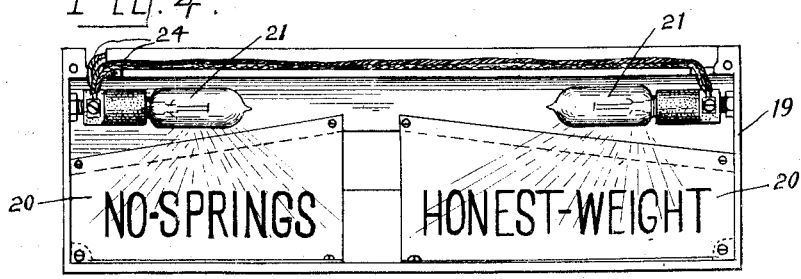
Figure 4 is a rear elevation of the frame carrying the electric lamps and plate with slanting back walls leading to the opening for the customer's indication.

In this particular embodiment shown in the drawings, the base 5 supports the housing 6 upon which rests the casing 7 containing the cylinder or indicating mechanism. The pendulum weighing mechanism is enclosed within the housing 6 and comprises a pendulum 8 pivotally mounted in brackets 9 at either side of the scale housing and connected with the rear end of the scale beam 10 by means of the stirrup 11 and flexible metallic ribbon 12 passing over the arcuate face of the segment 13 of the pendulum. The scale beam 10 is preferably a lever of the second order and supported adjacent its forward extremity upon standards carried by the base 5, the platform 14 resting upon the scale beam intermediate its fulcrum and its point of connection with the pendulum mechanism. At its inner end the scale beam is preferably formed with a transverse arm 15 to which is suitably connected the lower extremity of the rack rod 16 which carries at its upper extremity a rack adapted to mesh with a pinion on the shaft of the cylinder 17. The cylinder 17 is suitably journalled in the opposite ends of the housing 7 and comprises a plurality of circular spiders 18 secured at their hubs to the cylinder journal and at their peripheries support the chart which is suitably inscribed with weight and value numerals in the usual manner of cylinder computing scales. At the forward or merchant's side of the scale an elongated slot is provided in the cylinder casing 7 whereby all the rows of weight and value numerals are visible to the merchant, the correct weight and value at any desired price per pound being found with the co-operation of a fixed indicator wire stretched across the opening. At the rear or customer's side of the scale, however, only the weight of the article being weighed is exhibited, and, as hereinbefore stated, to enable this weight indication to be visible to customers on either side of the scale, I preferably construct and arrange the elements adjacent the rear indication as follows: A frame 19 (see Figure 4) having its front wall projecting forwardly adjacent the upper extremity is suitably secured at its corners to the housing 7 so that the periphery of the chart approaches closely to but does not contact with the front wall thereof. A plate 20 of enameled metal or similar light-reflecting substance is secured within the frame, substantially as shown in Figures 3 and 4, this plate being formed with a bottom flange lying flat against the lower wall of the frame and an upstanding wall which is inclined and extends diagonally inward from the rear portion of each side of the frame to the sides of the opening through which the weight indication is exhibited, the front of the plate adjacent the opening being substantially in line with the front of the side walls of the frame. This slanting arrangement of the upstanding wall of the plate 20 enables an unrestricted view of the chart visible through the customer's opening, even though the customer is standing at a position along the counter slightly removed from and at one side of the scale. It is to be noted that there is no top flange on the plate 20 (see Figures 3 and 4), and directly above the upstanding wall of said plate are arranged one or more electric lamps 21, which are suitably mounted in sockets on the side walls of the frame 19 and distribute their luminous rays over the entire surface of the upstanding wall of the plate 20, as well as upon the opening exhibiting the weight indication. In fact, the slanting arrangement of the upstanding wall of the plate 20 aids in throwing a large portion of these rays directly onto that portion of the cylinder shown through the opening. To enable the closing of the cylinder head against the entrance of dust, moisture, etc., while interfering as little as possible with the range of view allowed to the customer, I provide a scroll 22 adapted to be secured upon the rear of the housing 7 and containing a window 23 of transparent glass, through which may be seen the customer's indication and the plate 20.

If desired, the plate 20 may be constructed in one piece with the bottom flange bent to lie flat and with an aperture cut in the upstanding wall to exhibit the customer's indication or it may be be in a plurality of parts, substantially as shown in Figure 4, wherein the plate 20 is shown in two pieces separated at their inner ends a sufficient distance to allow the view of the weight indication. The plate 20 may bear advertising or directive signs, and also the window 23 may be formed with a portion of transparent glass and a portion of translucent or opaque material bearing advertising or similar signs, substantially as shown in Figure 3 of the drawings.

The illumination of the electric lamps 21 may be effected in any desired manner. As herein shown, the lamps are connected together and with a switch 25 actuated through the agency of the weighing mechanism of the scale by wires 24, suitable means being arranged intermediate the ends of the wires whereby they may be connected with the service line or other source of current, as, for example, the plug 26. The switch 25 preferably comprises a fixed contact post 26$^a$ and a resilient contact member 27, each of which is mounted upon, but insulated from, the bracket 28 secured within the housing 6 of the scale. An arm 29 carried upon the pendulum 8 is adapted to contact with the resilient member 27 when the scale is at zero—i. e., when no weighing operation is being performed—this arm 29 thereby separating the resilient contact 27 from the fixed contact post 26$^a$ and preventing the passage of the current to illuminate the lamps 21. However, when a commodity is placed upon the platform 14, the pendulum 8 is swung upwardly to offset the weight of the commodity and moves the arm 29 away from the resilient contact 27, permitting said resilient contact to engage with the fixed contact post 26$^a$, completing the circuit to illuminate the lamps. In this manner light is supplied to the customer's indication only when it is needed, and because of the arrangement of the lamps and the plate 20 with reference to the customer's indication, an excellent distribution of the light is provided. Similarly, lamps may be provided adjacent the merchant's indication at the front of the cylinder.

While it will be apparent that the illustrated embodiment of my invention herein disclosed is well calculated to adequately fulfill the objects primarily stated, it is to be understood that my invention is susceptible to modification, variation and change without departing from the spirit and scope of the invention as set forth in the subjoined claims.

Having described my invention, I claim:

1. In a scale, a casing, a cylindrical chart mounted in the casing and bearing weight indications on its periphery, and a plate arranged in the casing and having an opening therein adapted to align with the weight indications on the cylindrical chart, the side walls of the opening closely approaching the periphery of the cylindrical chart and said plate extending obliquely outward from the side walls of the opening to positions adjacent the ends of the cylinder.

2. In a scale, a casing, a cylinder rotatably mounted in the ends of the casing and bearing weight indications on its periphery, a plate formed of a plurality of sections arranged adjacent the cylinder and having an opening therein adapted to align with the weight indications on the cylinder, the side walls of the opening closely approaching the periphery of the cylinder and said plate extending diagonally outward from the side walls of the opening to positions adjacent the ends of the cylinder.

3. In a scale, a casing, a cylinder rotatably mounted therein and bearing weight indications on its periphery, a frame secured in the casing substantially parallel with and at the rear of the cylinder, and a plate carried by said frame and having an opening therein aligning with the weight indications on said cylinder, said plate being arranged diagonally across the frame whereby the side walls of the opening are disposed at the inner edge of the frame and closely approach the periphery of the cylinder, and the outer ends of the plate are adjacent the outer edge of the frame.

4. In a scale, a casing, a cylinder rotatably mounted in the casing and bearing weight indications on its periphery, a plate arranged adjacent the cylinder and having an opening therein adapted to align with the weight indications on the cylinder, said plate being formed with a bottom wall adapted to be secured to the casing and an upstanding wall disposed diagonally with respect to the axis of the cylinder whereby the side walls of the opening in said plate closely approach the periphery of the cylinder and the outer ends of the plate and spaced further from the cylinder.

5. In a scale, a casing, a cylinder rotatably mounted in the casing and bearing weight indications on its periphery, a plate arranged adjacent the cylinder and having an opening therein adapted to align with the weight indications on the cylinder, said plate being formed with a bottom wall adapted to be secured to the casing and an upstanding wall disposed diagonally with respect to the axis of the cylinder whereby the side walls of the opening in said plate closely approach the periphery of the cylinder and the outer ends of the plate are spaced further from the cylinder, and electric illuminating means mounted in the casing above said plate.

6. In a scale, a casing, a cylinder rotatably mounted in the ends of the casing and bearing weight indications on its periphery, a plate secured in said casing at the rear of the cylinder and having an opening therein adapted to align with the weight indications on the cylinder, said plate extending diagonally outward from the side walls of said opening to positions adjacent the ends of the casing, and electric lamps mounted in the casing above the plate and disposed so that the luminous rays will be reflected by the diagonal walls of the plate toward the weight indications on the cylinder.

7. In a scale, a casing, a cylinder rotatably mounted therein and bearing weight graduations on its periphery, a frame secured in said casing substantially parallel with and at the rear of the cylinder, a diagonally-disposed plate carried by said frame and having an opening therein aligning with the weight indications on the cylinder, the side walls of the opening closely approaching the cylinder, and said plate slanting outward from said side walls to positions adjacent the ends of the frame, and an electric lamp carried by the frame above said plate in position to transmit its luminous rays on said plate and cylinder indication.

ORWELL C. REEVES.

Witnesses:
C. E. WILCOX,
C. O. MARSHALL.